(12) United States Patent
Burns et al.

(10) Patent No.: US 8,836,543 B2
(45) Date of Patent: Sep. 16, 2014

(54) FLIGHT DECK HAVING A DUAL-VIEW DISPLAY AND A METHOD FOR OPERATING SAME

(75) Inventors: Timothy Donal Paul Burns, Richmond Hill, GA (US); Dashiell Matthews Kolbe, Grand Rapids, MI (US); Norman Leonard Ovens, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 13/173,120

(22) Filed: Jun. 30, 2011

(65) Prior Publication Data

US 2013/0002453 A1    Jan. 3, 2013

(51) Int. Cl.
*G01C 23/00* (2006.01)
(52) U.S. Cl.
CPC ...................................... *G01C 23/00* (2013.01)
USPC ........................................... 340/971; 345/156
(58) Field of Classification Search
USPC .......... 345/156, 87; 701/454, 3; 340/971, 949
See application file for complete search history.

(56) References Cited

U.S. PATENT DOCUMENTS

| 5,566,073 | A   | * | 10/1996 | Margolin       | 701/454 |
| 7,751,948 | B2  | * | 7/2010  | Boorman et al. | 701/3   |
| 2008/0088935 | A1 | * | 4/2008 | Daly           | 345/87  |
| 2013/0038525 | A1 | * | 2/2013 | Hakegard et al.| 345/156 |

OTHER PUBLICATIONS

John Blau, Sharp Shows Dual-View LCD, PCWorld.com, Sep. 2, 2005 http://www.pcworld.com/article/122407/sharp_shows_dualview_lcd.html.
Peter Rojas, GM Signs Up for Sharp's Dual-View LCD, engadget. com, Sep. 4, 2005 http://www.engadget.com/2005/09/04/gm-signs-up-for-sharps-dual-view-lcd/.
Techwell Inc., tw8810 3D Decoder based on LCD controller for Sharp dual-view digital panel, 2008 http://techwellinc.com/products/brochures/TW8810.pdf.
Ed Oswald, Sharp Introduces Dual-View LCD, Jul. 14, 2005 http://www.betanews.com/article/Sharp-Introduces-DualView-LCD/1121361848.
Dual View LCD Display, Jul. 14, 2005 http://digitalcamera.101reviews.com/news/dual-view-lcd-display.
Madwrites.com, Sharp Dual View LCD Monitors, Feb. 5, 2008 http://www.madwrites.com/2008/02/sharp-dual-view-lc.html.
Derek Sooman, Sharp to release Dual View LCD, TechSpot.com, Jul. 15, 2005 http://www.techspot.com/news/18068-sharp-to-release-dual-view-lcd.html.
Bill Blankmeyer, Sharp's Dual View LCD Screen, blankmeyer. blogspot.com, Jul. 15, 2005 http://blankmeyerblogspot.com/2005/07/sharps-dual-view-lcd-screen.html.

(Continued)

*Primary Examiner* — Steven Lim
*Assistant Examiner* — Kaleria Knox
(74) *Attorney, Agent, or Firm* — McGarry Bair PC

(57) ABSTRACT

A flight deck for an aircraft having a first display associated with a first pilot and displaying a first image comprising a first set of flight information for the first pilot and a second display associated with a second pilot and displaying a second image comprising a second set of flight information for the second pilot. The second display is a dual-view display simultaneously generating a third image along with the second image, with the second image viewable by the second pilot, but not the first pilot, the third image viewable by the first pilot, but not the second pilot, and the third image containing a subset of information from the second set of flight information.

12 Claims, 2 Drawing Sheets

(56) References Cited

OTHER PUBLICATIONS

Cesar A. Beradini, Sharp Unveils Dual View LCD, news.teamxbox. com, Jul. 15, 2005 http://news.teamxbox.com/xbox/8741/Sharp-Unveils-Dual-View-LCD/.
Johnb, Sharp Dual View Display, gizmodo.com, Jul. 15, 2005 http://gizmodo.com/112736/sharp-dual-view-display.
John Blau, Sharp shows new dual-view LCD, infoworld.com, Sep. 2, 2005 http://www.infoworld.com/t/hardware/sharp-shows-new-dual-view-lcd-998.
Luigi Lugmayr, Sharp Announces Unbelievable Dual View LCD Monitor, i4u.com, Jul. 14, 2005 http://www.i4u.com/8229/sharp-announces-unbelievable-dual-view-lcd-monitor.
Intersil Americas Inc. TW8810C 3D Decoder based on LCD controller for Sharp dual-view digital panel http://www.intersil.com/products/deviceinfo.asp?pn=TW8810C, May 31, 2011.
uberreview.com, Sharp Dual View TV, Jul. 14, 2005 http://www.uberreview.com/2005/07/sharp-dual-view-tv.htm.
newlaundes.com, Sharp Dual-View LCD Screen, Jul. 14, 2005 http://www.newlaunches.com/archives/sharp_dualview_lcd_screen.php.
cheesegod.com, Sharp's Dual View TV, Jul. 19, 2005 http://cheesegod.com/4/sharp.shtml.
John Blau, Sharp shows new dual-view LCD, tech-show.blogspot.com, Sep. 5, 2009 http://tech-show.blogspot.com/2005/09/sharp-shows-new-dual-view-lcd.html.
Mondochee, Sharp Debuts Dual View LCD Display, neowin.net, Jul. 15, 2005 http://www.neowin.net/news/sharp-debuts-dual-view-lcd-display.
Anton Shilov, Sharp to Produce Dual-View LCDs, xbitlabs.com, Jul. 18, 2005 http://www.xbitlabs.com/news/multimedia/display/20050718212447.html.
Newsfactory, Sharp Unveils Dual View LCD, warp2search.net, Jul. 15, 2005 http://www.warp2search.net/news/story/sharp_unveils_dual_view_lcd.html.
Jo, Op Art + DualView LCD, turbulence.org, Jul. 18, 2005 http://www.turbulence.org/blog/archives/001127.html.
All_Texan, GM signs up for Sharp's dual-view LCD, forums.fourtitude.com, Sep. 5, 2005 http://forums.fourtitude.com/showthread.php?2173242-GM-signs-up-for-Sharp%92s-dual-view-LCD.
usernomics.com, PCWorld.com—Sharp Shows Dual-View LCD, Sep. 4, 2005 http://usabilitynews.usernomics.com/2005/09/pcworldcom-sharp-shows-dual-view-lcd.html.
Lu Zhou, Toyota Introduces Dual-View Navi, autoblog.com, Sep. 28, 2005 http://www.autoblog.com/2005/09/28/toyota-introduces-dual-view-navi/.
Graham Prophet, Sharp expands its repertoire of LCDs for in-car use, edn.com, Apr. 8, 2010 http://www.edn.com/article/457469-Sharp_expands_its_repertoire_of_LCDs_for_in_car_use.php.
hardwareforums.com, Sharp Debuts Dual View LCD Display, Jul. 15, 2005 http://www.hardwareforums.com/threads/sharp-debuts-dual-view-lcd-display.5669/.
adverlab.blogspot.com, Sharp Announces Dual-View Display, Jul. 15, 20005 http://adverlab.blogspot.com/2005/07/sharp-announces-dual-view-display.html.
Vince Biancomano, In-car display processor drives Sharp's dual-view LCDs, eetimes.com, Jan. 15, 2007 http://www.eetimes.com/electronics-products/analog-products/4091208/1n-car-display-processor-drives-Sharp-s-dual-view-LCDs.

* cited by examiner

FLIGHT DECK HAVING A DUAL-VIEW DISPLAY AND A METHOD FOR OPERATING SAME

BACKGROUND OF THE INVENTION

Contemporary aircraft cockpits include a flight deck having multiple flight displays, which display to the pilots a wide range of aircraft, flight, navigation, and other information used in the operation and control of the aircraft. The multiple flight displays may be shared by multiple pilots, who sit in a side-by-side arrangement, because crew members must be able to view the flight displays across the flight deck to be able to see what is on another pilot's displays for cross-checking purposes. It is common that when a second pilot reads the first pilot's display the information displayed may be harder to read or distorted due to the angle the second pilot is at from the first pilot's display. The displays are typically designed to be readable from such a cross-side viewing angle, but it is difficult to maintain color and contrast. Further, the information provided by each display may not be best suited for cross-checking as a pilot may need more information than the pilot who is cross-checking the information.

BRIEF DESCRIPTION OF THE INVENTION

In one embodiment, a flight deck for an aircraft includes a first display associated with a first pilot and displaying a first image comprising a first set of flight information for the first pilot and a second display associated with a second pilot and displaying a second image comprising a second set of flight information for the second pilot. The second display is a dual-view display simultaneously generating a third image along with the second image, with the second image viewable by the second pilot, but not the first pilot, the third image viewable by the first pilot, but not the second pilot, and the third image containing a subset of information from the second set of flight information.

In another embodiment, a method of providing information on an aircraft flight deck having a first display for a first pilot and a second display for a second pilot includes displaying on the first display a first image comprising a first set of flight information for the first pilot, displaying on the second display a second image comprising a second set of flight information, which is viewable by the second pilot, but not the first pilot, and displaying on the third display a third image comprising a subset of the second set of flight information, which is viewable by the first pilot, but not the second pilot. The second display is a dual-view display generating a first image viewable by the first pilot, but not the second pilot, and a second image viewable by the second pilot, but not the first pilot, with the second image containing a subset of information from the second set of flight information.

DESCRIPTION OF EMBODIMENTS OF THE INVENTION

Figure 1:
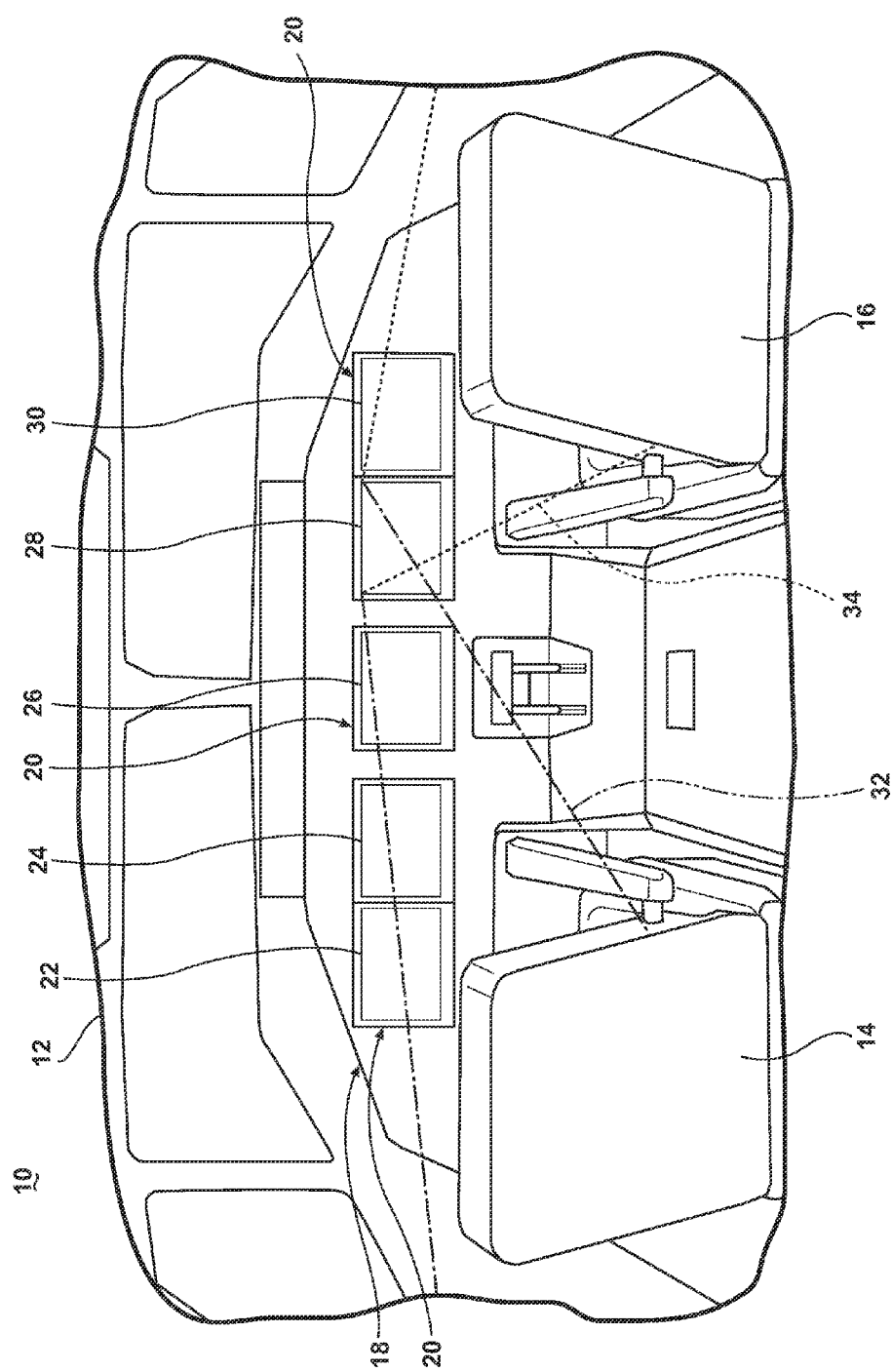
FIG. 1 is a perspective view of a portion of an aircraft cockpit having a dual-view display according to a first embodiment of the invention.

FIG. 1 illustrates a portion of an aircraft 10 having a cockpit 12 with a pilot seat 14, a co-pilot seat 16, and a flight deck 18 having multiple flight displays 20. It will be understood that a first pilot (not shown) may be present in the pilot's seat 14 while a second pilot (not shown), for example a co-pilot, may be present in the co-pilot's seat 16. While a commercial aircraft has been illustrated it is contemplated that the invention may be used in any type of aircraft, for example, without limitation, fixed-wing, rotating-wing, rocket, personal aircraft, and military aircraft.

The multiple flight displays 20 have been illustrated as including displays 22 and 24, which are located on the flight deck 18 in front of the pilot's seat 14, display 26, which may be located on the flight deck 18 between the pilot's seat 14 and co-pilot's seat 16, and displays 28 and 30, which are located on the flight deck 18 in front of the co-pilot seat 16. The displays 22 and 24 may provide images primarily for the use of a first pilot in the pilot's seat 14 in this manner they may be considered to be associated with the first pilot. The image displayed on the display 26 may be used by both pilots. Because the displays 28 and 30 are in front of a second pilot in the co-pilot's seat 16 they may be considered to be associated with the second pilot.

Each flight display 22, 24, 26, 28, and 30 is illustrated as being in a spaced, side-by-side arrangement with the other displays and is illustrated as including a display device such as, by way of non-limiting example, a color flat-panel LCD screen. The displays 22-30 may include either primary flight displays or multi-function displays and may display a wide range of aircraft, flight, navigation, and other information used in the operation and control of the aircraft 10.

The displays 22, 24, 26, 28, and 30 may be used by either pilot and the multiple flight displays 20 may be laid out in any manner including having fewer or more displays. Further, the displays 22, 24, 26, 28, and 30 need not be coplanar and need not be the same size. By way of non-limiting example, the center display may be removed and larger displays may be used such that the display 24 is in a side-by-side relationship with the display 28.

Any of the displays in the flight deck 18 may be dual-view displays according to the invention. However, in the remainder of the description only the dual-view display 28 will be illustrated and described as being a dual-view display, which is configured to simultaneously generate two different images, which are typically viewable from either the left side or the right side of the dual-view display 28. The dual-view display 28 provides different images to each observer based on their viewing angle. More specifically, the dual-view display 28 may generate an image viewable within a viewing region 32, which is illustrated as encompassing the pilot's seat 14. The dual-view display 28 may generate a separate image viewable within a separate viewing region 34, which is illustrated as encompassing the co-pilot's seat 16. Each image is visible only in a specific direction so that an observer viewing the dual-view display 28 from one direction will see one image whereas an observer viewing the dual-view display 28 from another different direction will see a different image.

For example, the viewing region 32 may by way of non-limiting example be defined such that the image is viewable from a viewing angle of 40 to 90 degrees to the left measured from the normal of the dual-view display 28. The viewing region 34 may by way of non-limiting example be defined such that the alternative image is viewable from a viewing angle of 20 to 80 degrees to the right measured from the normal of the dual-view display 28. Such viewing angles and viewing regions may be adjusted for aircrafts having alternative seat spacing and seating arrangements.

The regions between the viewing regions 32 and 34 may form a region wherein an observer located in the region will perceive cross-talk of the first image and the second image; thus, the viewing regions 32 and 34 may be separated enough from each other to ensure that such cross-talk does not occur when the pilot and co-pilot are seated in the pilot's seat 14 and co-pilot's seat 16, respectively.

Figure 2:
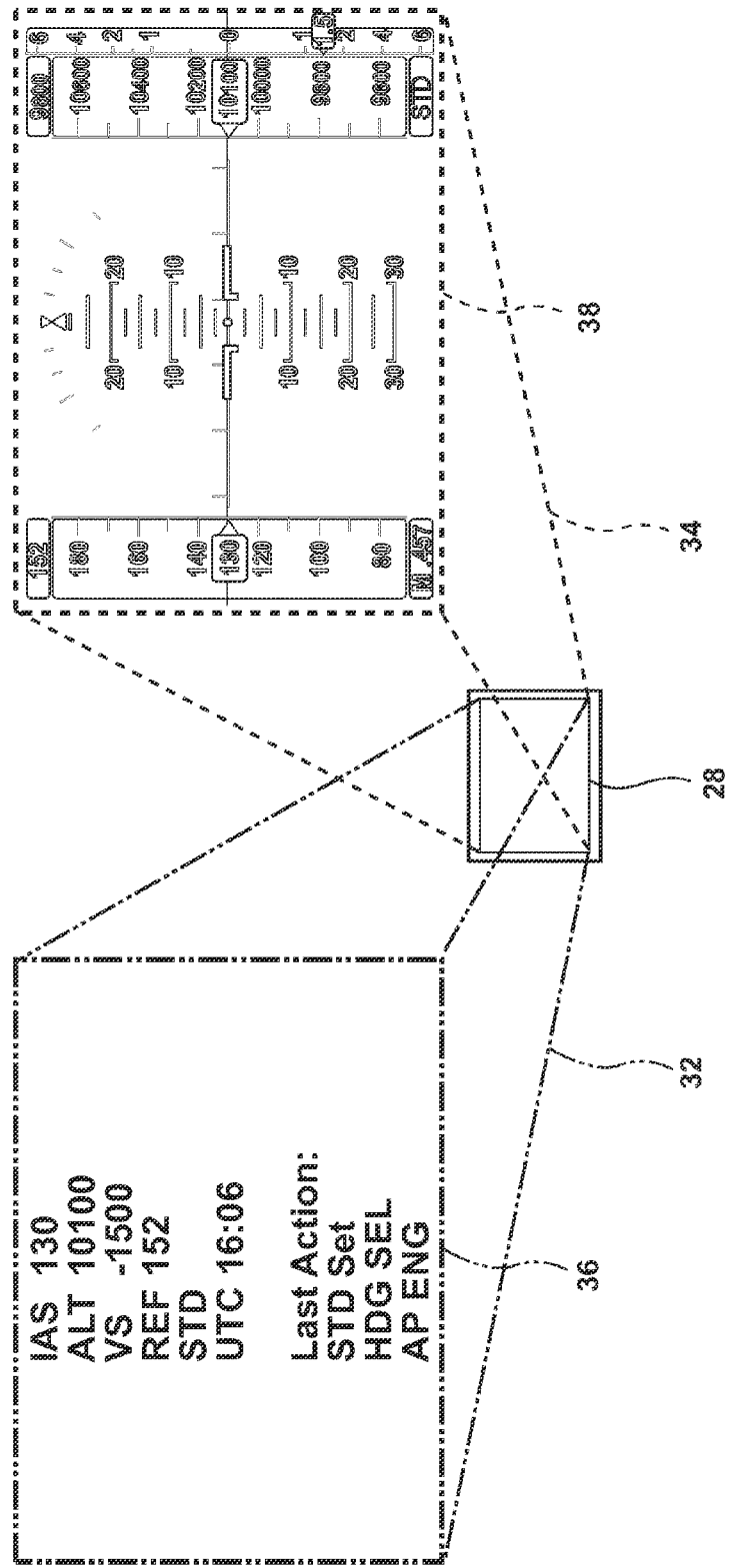
FIG. 2 is a schematic front view of a dual-view display and images generated by the display.

The dual-view display 28 may have one or more processors (not shown) capable of generating an image 36 readily viewable by the pilot on the left side and simultaneously generating a different image 38 readily viewable by the co-pilot on the right side, both of which are schematically illustrated in FIG. 2. It should be appreciated that the images 36 and 38 may be simultaneously displayed on the dual-view display 28 to provide separate image content to the separate viewing regions 32 and 34.

During operation the displays 22-30 may display various images, which may include various flight information that may be used in operating and controlling the aircraft 10. The images may include video images, picture images, text messages, and other content and are not limited to the described illustration. By way of non-limiting example, the display 22 may display a first image (not shown) comprising a first set of flight information for the first pilot while the dual-view display 28 may display a second image 38, which includes a second set of flight information for the second pilot. Simultaneously the dual-view display 28 may generate a third image 36 along with the second image 38. The second image 38 is viewable by the second pilot, but not the first pilot and the third image 36 is viewable by the first pilot, but not the second pilot.

It may be seen in the illustrative example that the third image 36 contains a subset of information from the second set of flight information shown in the image 38. It is contemplated that the second set of flight information will have at least some different information than the first set of flight information and that the at least some different information is displayed on the third image. By way of non-limiting example the image 38 may display various air speed, altitude, and vertical speed indicators in the form scales as well as an aircraft reference symbol, a ladder representing the pitch scale, and an artificial horizon. The image 36 on the other hand displays numerically the air speed, altitude, vertical speed, reference air speed of the aircraft 10 as well as an indicator of standard altitude and a universal time code. Also shown in the image 36 is a listing of the last few on-side pilot actions, including by way of non-limiting examples, that the standard altitude was set, that a heading was selected, and that the autopilot was engaged.

Thus, it is contemplated that the information may be displayed in a different format on the third image than on second image. Further, the different information may be displayed in a different arrangement on the third image than on the second image. This allows for the tailoring of viewable data for each user and acts to produce efficient display formats to simplify cross-side checks as a selective set of parameters may be picked to optimize the cross-checking and the format including size and color may be enhanced for readability. It is contemplated that many alternative images and various alternative information may be shown in such a third image.

Further, it is contemplated that the images may be adjusted such that the images displayed compensate for the viewing angle of the user. The pilot's seat 14 and co-pilot seat 16 are fixed with respect to the displays 22, 24, 26, 28, and 30; thus, the images may be adjusted by the processors so that they do not look skewed due to the observer's position relative to the display. Essentially, the images may be de-skewed and the images presented to the observer in the viewing regions 32 and 34 may be displayed in what appears to be an undistorted fashion.

The above described embodiment and method allow for a dual-view display that may show different images to multiple users and provides a considerable saving in space and cost compared with the use of two or more separate displays. Further, as the pilot may see a subset of information the pilot may not be distracted by image content that is not relevant to the cross-checking function, while at the same time allowing the co-pilot to view other additional image content. The above described embodiment would allow each pilot to potentially use all of the displays for their own independent needs, which may double the dedicated viewing area for each user. It is also contemplated that various other information could be shown on such cross-side views including various instrumentation including, but not limited to, a ships clock view of the on-side pilot's instruments, which is corrected for the perspective of cross-side pilot viewing them, which may save on cost of the instruments themselves, and allow for better visibility of such instruments.

It will be understood that although the above example refers to the pilot receiving an image that contains a subset of the information shown the co-pilot this may obviously be switched such that the dual-view display is associated with the pilot and that an image may be generated that is viewable by the co-pilot, which illustrates a subset of the information shown to the pilot.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flight deck for an aircraft for use by at least a first pilot and a second pilot, comprising:
   a dual-view display simultaneously generating a first image and a second image with the first image overlapping the second image and where the second image is viewable at a different viewing angle than the first image;
   the dual-view display located on the flight deck such that the first image is viewable by the first pilot, but not the second pilot, and the second image is viewable by the second pilot, but not the first pilot;
   wherein the first image comprises a first set of flight information displayed in a first format and the second image comprises a subset of the first set of flight information, with the subset of flight information being displayed in second format, which is different from the first format.

2. The flight deck of claim 1 wherein the second image is viewable from a viewing angle of 40 to 90 degrees left of normal of the display.

3. The flight deck of claim 1 wherein the first image is viewable from a viewing angle of 20 to 80 degrees right of normal of the display.

4. The flight deck of claim 1 wherein the first set of flight information has at least some different information than the subset of flight information.

5. The flight deck of claim 4 wherein at least some of the different information is displayed on the first image.

6. The flight deck of claim 1 wherein the subset of information is displayed in a different arrangement on the second image than on the first image.

7. A method of providing information on an aircraft flight deck having a display for a first pilot and a second pilot, the method comprising:
   displaying on the display a first image comprising a first set of flight information in a first format, which is viewable by the first pilot, but not the second pilot; and
   displaying on the display a second image overlapping the first image with the second image comprising a subset of the first set of flight information in a second format that is different from the first format, and the subset of flight information viewable at a different viewing angle than the first image such that it is viewable by the second pilot, but not the first pilot.

8. The method of claim 7 wherein the second image is viewable from a viewing angle of 40 to 90 degrees left of normal of the display.

9. The method of claim 7 wherein the first image is viewable from a viewing angle of 20 to 80 degrees right of normal of the display.

10. The method of claim 7 wherein the first set of flight information has at least some different information than the subset of flight information.

11. The method of claim 10 wherein at least some of the different information is displayed on the first image.

12. The method of claim 7 wherein the subset of information is displayed in a different arrangement on the second image than on the first image.

\* \* \* \* \*